(12) United States Patent
Scripca et al.

(10) Patent No.: US 9,153,970 B2
(45) Date of Patent: Oct. 6, 2015

(54) DRIVE CIRCUIT FOR DC LATCHING DEVICES

(75) Inventors: Lucian Scripca, San Marcos, CA (US); Peter J. Woytowitz, San Diego, CA (US)

(73) Assignee: Hunter Industries, Inc., San Marcos, CA (US)

( * ) Notice: Subject to any disclaimer, the term of this patent is extended or adjusted under 35 U.S.C. 154(b) by 767 days.

(21) Appl. No.: 13/474,400

(22) Filed: May 17, 2012

(65) Prior Publication Data

US 2012/0261600 A1 Oct. 18, 2012

Related U.S. Application Data

(63) Continuation of application No. 12/479,649, filed on Jun. 5, 2009, now Pat. No. 8,183,719.

(60) Provisional application No. 61/074,337, filed on Jun. 20, 2008.

(51) Int. Cl.
| | |
|---|---|
| *H02B 1/24* | (2006.01) |
| *H01H 19/64* | (2006.01) |
| *H01H 31/10* | (2006.01) |
| *H01H 33/52* | (2006.01) |
| *H01H 33/59* | (2006.01) |
| *H01H 47/00* | (2006.01) |
| *H01H 85/46* | (2006.01) |
| *H01H 19/14* | (2006.01) |
| *H02J 7/00* | (2006.01) |
| *H01H 47/04* | (2006.01) |
| *H01H 51/00* | (2006.01) |
| *H01H 51/10* | (2006.01) |
| *H02J 7/34* | (2006.01) |

(52) U.S. Cl.
CPC ............... *H02J 7/00* (2013.01); *H01H 47/043* (2013.01); *H01H 51/00* (2013.01); *H01H 51/10* (2013.01); *H02J 7/345* (2013.01); *Y10T 307/766* (2015.04); *Y10T 307/858* (2015.04)

(58) Field of Classification Search
CPC ............ H01H 51/00; H02J 7/00; H02J 7/345; Y10T 307/858; Y10T 307/766
USPC .......................... 307/112, 115, 130; 361/160
See application file for complete search history.

(56) References Cited

U.S. PATENT DOCUMENTS

| | | | |
|---|---|---|---|
| 5,914,847 A | 6/1999 | Alexanian et al. ............. 361/156 |
| 5,942,892 A * | 8/1999 | Li ............................ 324/207.16 |
| 6,903,554 B2 * | 6/2005 | Wilson et al. .................. 324/418 |
| 7,768,257 B2 | 8/2010 | Lueck ............................ 324/207 |
| 8,183,719 B2 * | 5/2012 | Scripca et al. ................. 307/130 |
| 2010/0161144 A1 | 6/2010 | Crist .............................. 700/284 |

* cited by examiner

*Primary Examiner* — Carlos Amaya
(74) *Attorney, Agent, or Firm* — Knobbe Martens Olson & Bear LLP

(57) ABSTRACT

A drive circuit for a DC latching device includes a battery, a storage element, and a plurality of switches connecting the battery to the storage element for charging the storage element from the battery and discharging the storage element into the coil of a DC latching device. The drive circuit further includes components for determining a state of the DC latching device. The drive circuit may include components for terminating the discharge of the storage element into the coil of the DC latching device in response to determining that the DC latching device has changed states to add reliability to the system and reduce energy consumption.

20 Claims, 8 Drawing Sheets

DRIVE CIRCUIT FOR DC LATCHING DEVICES

CROSS-REFERENCE TO RELATED APPLICATION

The present application claims priority based on the similarly entitled U.S. Provisional Patent Application Ser. No. 61/074,337 filed Jun. 20, 2008 naming Lucian Scripca and Peter J. Woytowitz. The present application is also a continuation of currently pending U.S. patent application Ser. No. 12/479,649 filed Jun. 5, 2009, which has been allowed and is expected to issue as a U.S. Pat. No. 8,183,719 on May 22, 2012. The entire disclosure of each of the two above-identified patent applications is hereby incorporated by reference.

FIELD OF THE INVENTION

The present invention relates to circuits and devices for switching solenoids, relays and other DC latching devices.

BACKGROUND OF THE INVENTION

DC latching solenoids and relays are used in many applications such as irrigation, plumbing, and electrical control. These devices use pulses of energy to establish one of several stable states, although a DC latching device with two stable states is the most common arrangement. For instance, in the case of a valve being controlled by a DC latching solenoid, the two states are OPEN (water, gas, etc. flowing) and CLOSED (water, gas, etc. not flowing). In the case of a DC latching relay, the states may be ON (conducting) or OFF (non-conducting).

SUMMARY OF THE INVENTION

In accordance with the present invention, a drive circuit for a DC latching device includes a battery. The Drive circuit may also include a capacitor or other storage element, and a plurality of switches connecting the battery to the storage element for charging the storage element from the battery and discharging the storage element into the coil of a DC latching device. The drive circuit further includes components for determining a state of the DC latching device. The drive circuit may include components for terminating the discharge of the battery or the storage element, into the coil of the DC latching device in response to determining that the DC latching device has changed states to add reliability to the system and reduce energy consumption.

DETAILED DESCRIPTION

Figure 1:
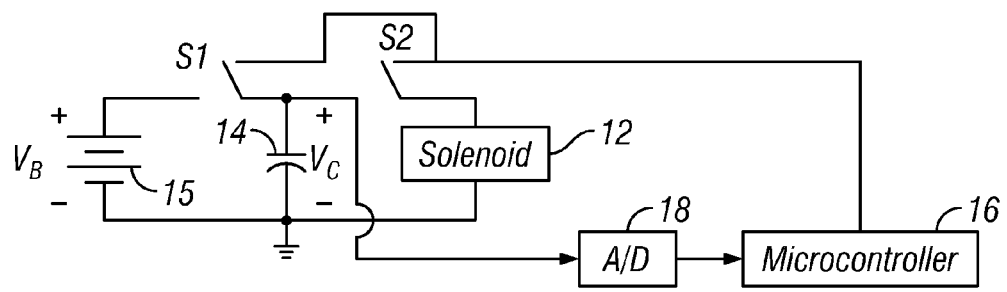
FIG. 1 is a functional block diagram of a drive circuit in accordance with one embodiment of the present invention that utilizes an A/D converter to detect an inflection point in the discharge signal from the storage element that indicates that a DC latching solenoid has changed states.

DC latching devices can be driven in a number of ways, but are typically pulsed with some amount of energy that causes them to latch them into one of the stable states. In some configurations, several wires are brought out of the device (one for each stable state, along with a common) and the devices are pulsed individually to put them into the desired state. Configurations that support two states can be controlled with as few as two wires. These devices can be pulsed with one polarity to achieve a first state and with the opposite polarity to achieve a second state.

A DC latching device employs a magnetic circuit. A ferrous plunger is located partially adjacent to a coil (wire windings), and a permanent magnet. When current is passed through the coil, the plunger is magnetized. The plunger may have some slight residual magnetism, but this is significantly increased when the current is applied. The application of the current causes the plunger to retract into the coil (for the correct direction of current flow), and latch into place due to the attractive force of the permanent magnet. In order to latch the plunger must overcome the force of a biasing spring, which normally keeps the plunger in its unlatched position. To unlatch the device, a current of the opposite polarity is passed through the coil, causing it to impose the opposite polarity magnetic field on the plunger. At the point when this field cancels out the field from the permanent magnet that has been latching the plunger in place, the force of the spring pushes the plunger out again, thus unlatching the device. See, for example, U.S. Pat. No. 4,494,096 of Fuzzell granted Jan. 15, 1985.

The plunger of a DC latching device can be mechanically connected to an actuator of another device to achieve the desired end result. In an irrigation valve, the plunger of a DC latching solenoid is connected to a seal, which opens an closes a pilot valve orifice in order to control the flow of water to and from one side of the main diaphragm, thus controlling the OPEN and CLOSED state of the valve. In a relay, the plunger may be connected to a plate with electrical contacts on the end. These electrical contacts make or break a connection to another set of electrical contacts depending on the position of the plunger, which allows a separate electrical current to be controlled.

The primary advantage of a DC latching solenoid or relay is that it uses zero energy once it is latched. Thus these devices can be used in battery-operated controls where conservation of energy is important and/or limited power is available. However, even when these DC latching devices are utilized, circuits for driving them may not provide optimal energy savings. Manufactures of conventional DC latching solenoids and relays typically publish the amount of energy required to ensure that their devices will latch in reliable fashion. The power ratings that will ensure reliable latching typically have a large safety factor designed into the same in order to account for part-to-part and manufacturing tolerance variations, as well as effects of ambient temperature, secondary surrounding magnetic fields, etc. Furthermore, when engineers incorporate conventional DC latching devices into their designs, many times they do not know how much wire will be installed between the drive circuit, and the DC latching solenoid or relay. They must therefore increase the drive energy to a level that will compensate for the worst-case losses in the wire. Applications that have less wire simply waste the energy which is beyond that required to reliably latch the DC latching device.

In one form of solenoid drive circuit, a storage capacitor, or other storage element, is charged, and then the charge is dumped into the DC latching device. This charge-and-dump approach is utilized because the batteries that power conventional DC latching devices typically do not have the current to supply the required surge of energy. Therefore, energy is first slowly delivered to a storage element using a low current charge circuit. The storage element provides a temporary storage for energy drawn from the batteries. The storage element can then quickly deliver the high current surge required to latch the device. This technique adds additional inefficiency. This is because the storage element discharges exponentially, and therefore, it must be oversized to ensure that the voltage being delivered to the DC latching device does not drop appreciably before the device actually latches.

Another potential challenge with drive circuits for DC latching devices relates to safety. Even though the latching device may receive a signal that is supposed to drive it from one state or the other, there is no feedback that this has actually occurred. In an automated irrigation system this type of failure can result in very costly damage, e.g. failure of a valve to open and the resulting death of the vegetation, or failure of the valve to close, resulting in flooding and massive waste of water resources.

The present invention provides a drive circuit for a DC latching device which is dynamic in that just enough energy is provided to reliably latch the DC latching device regardless of the type of application or the amount of wiring, while simultaneously providing a feedback signal that indicates whether the latching has been successful. The drive circuit of the present invention can achieve both of these objectives by determining the position of the plunger, without the use of any additional position sensor. Thus the drive circuit of the present invention latches and unlatches a solenoid, relay, or other DC latching device in a very efficient manner. In applications relying on battery power, the drive circuit of the present invention can significantly increase the life of the battery by conserving its energy. In order to latch the DC latching device, the drive circuit delivers energy to its coil until it determines that the plunger is in the fully retracted state, at which time the drive circuit immediately stops delivering energy. The drive circuit of the present invention can deliver exactly the correct amount of energy to the DC latching device and no extra unneeded energy in order to change its state. Furthermore, the drive circuit of the present invention accommodates part-to-part and manufacturing tolerance variations that exist from one DC latching device to another, each time delivering exactly the right amount of energy for that particular device. The drive circuit of the present invention uses the same principle to accomplish de-latching process, in an equally efficient manner.

The drive circuit of the present invention also provides a way of determining if the latching or de-latching has actually occurred. Retries can therefore be attempted if the desired change of state of the DC latching device has not taken place. Also, even though the device may initially latch, it is possible for a strong secondary magnetic field, or mechanical shock to cause it to unlatch. Plunger position sensing which is made possible with the present invention allows the drive circuit to send a second latch signal to return the DC latching device the desired state. The plunger position sensing enabled by the present invention increases reliability, and reduces energy consumption in applications employing DC latching solenoids, relays and other devices.

The present invention includes several approaches for determining when a plunger in a DC latching device has actually latched or unlatched. The fact that the plunger retracts into the coil for one of the states and not the other is beneficially exploited by the drive circuit of the present invention. The inductance of the coil changes depending upon the position of the plunger relative to the coil. This difference in inductance can be quite pronounced. For the DC latching solenoid used in battery operated irrigation control products manufactured by Hunter Industries, Inc., the assignee of the subject application, this variation measures about thirty percent, varying from approximately twenty-nine mH in the latched position, to approximately nineteen mH in the unlatched position.

One embodiment of the present invention utilizes a frequency domain approach in which the inductance of the coil of a DC latching device is measured by passing an AC signal of a predetermined known frequency and voltage through the coil of the solenoid, and measuring the current. This yields the inductive reactance which is related to the inductance by the following formula:

$$X = 2\pi \times f \times L$$

where X is the reactance;
$2\pi = 6.28$;
f=frequency in Hz; and
L=inductance in Henrys.

Another embodiment of the present invention utilizes a time domain approach to determine when the plunger reaches the end of its travel. A storage element is discharged into a DC latching device and the voltage across the storage element decays exponentially. A momentary non-linear change in the rate of decay indicates the precise time that the plunger travels through the coil. When this bump or inflection in the rate of decay subsides, the plunger has completed its movement. An A/D converter can be used to continuously sample the signal from the coil, and a processor can detect that bump that indicates when the plunger has reached the end of its travel. Any signal applied to the coil after the bump represents energy that is wasted and not necessary to cause the DC latching device to change states. The present invention allows this energy to be saved for the next actuation, or diverted back into the apparatus (ref FIG. 18) to supplement the energy supplied by the batteries.

The frequency domain and time domain approaches can be used in combination. The time domain approach can be used to determine when the plunger has reached the end of its travel, and then the drive circuit can stop supplying energy at this point. Thereafter the drive circuit can periodically use the frequency domain approach to make sure the plunger is still latched or unlatched. The drive circuit can be adapted to learn the minimum amount of energy that the solenoid needs to switch states, and then always supply that amount of energy as opposed to repeatedly sensing the position of the plunger.

Figure 2:
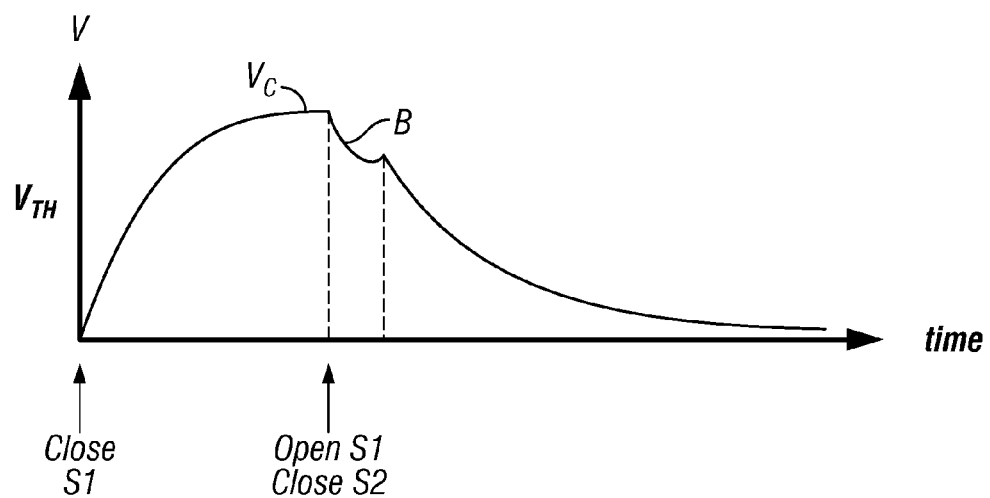
FIG. 2 is a graph illustrating the operation of the drive circuit of FIG. 1.

FIG. 1 illustrates a simplified form of a drive circuit 10 that may be used to energize a DC latching solenoid 12. The switches S1 and S2 may be MOSFET devices or bipolar transistors. Additional conditioning and current limiting circuitry may be utilized. This additional circuitry is not illustrated in FIG. 1 for ease of understanding. Typically, the switch S1 is first closed until the storage element 14 is charged to a predetermined threshold voltage Vth by a battery 15, which is sufficient to change the state of the solenoid 12. The switch S1 is then opened, and the switch S2 is closed, thus discharging the storage element 14 into the coil of the solenoid 12. This discharge exhibits an exponential decay. However, when the plunger of the solenoid 12 moves into or out of the coil of the solenoid, a voltage is induced into the windings and causes a slight inflection point B in the discharge as illustrated in FIG. 2. The inflection point B can be used to determine when the plunger stops moving (when the rate of decay curve returns to normal exponential discharge). In FIG. 2 the plunger stops moving at the time indicated by the right one of the two vertical phantom lines. Various different types of circuitry, such as a differentiator, can be used to detect the inflection point B. However, in the preferred embodiment, for the sake of economy, a commercially available microcontroller 16 is utilized that incorporates an A/D converter 18. The A/D 18 converter periodically takes readings to determine when the inflection point B occurs. Switches S1 and S2 are opened and closed by the microcontroller 16.

Figure 3:
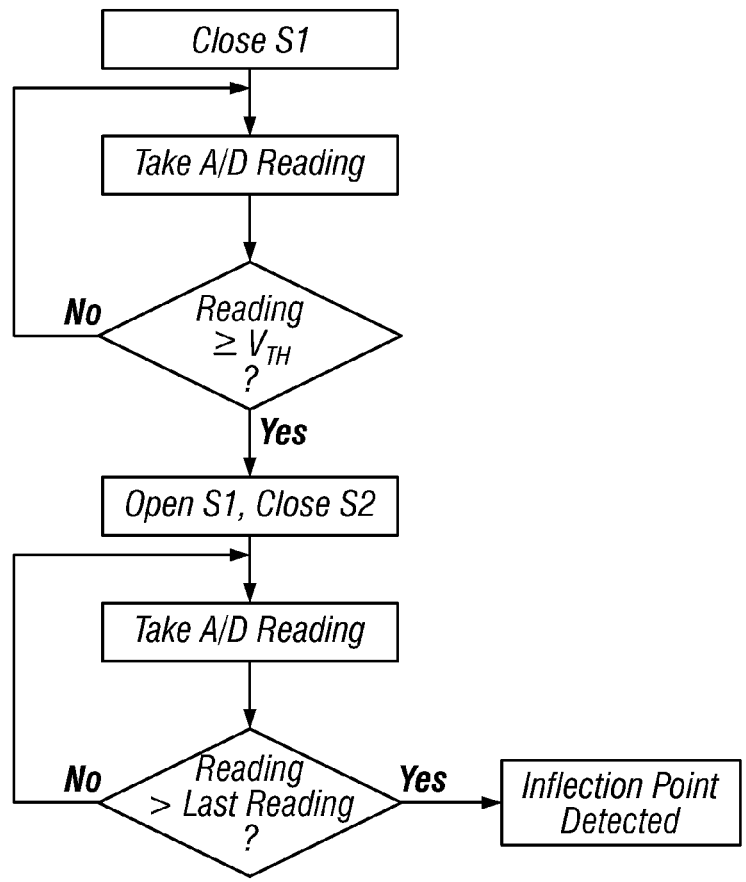
FIG. 3 is a flow diagram illustrating the operation of the drive circuit of FIG. 1.

The flow chart of FIG. 3 illustrates an example of how the A/D converter 18 is first used to charge the storage element 14, and then to determine when the inflection point B occurs. Depending on the size of the solenoid 12, the inflection point B may not have a reverse-slope, but it will always disrupt the exponential decay. This disruption can be detected using mathematical approaches other than the simple slope reversal detected in the technique illustrated the flow chart of FIG. 3.

Figure 4:
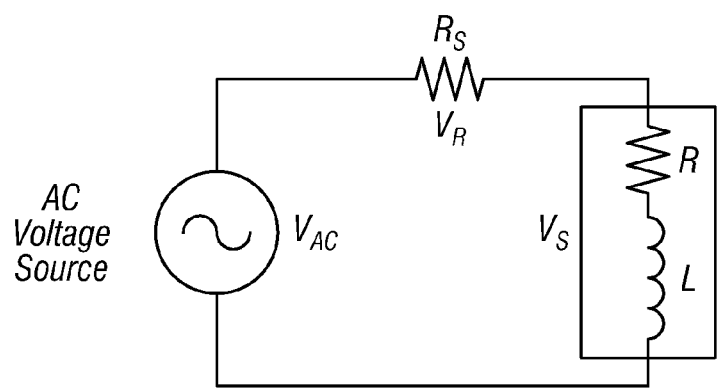
FIG. 4 is a functional block diagram of an alternate embodiment that senses a state of a DC latching solenoid by determining an inductance of its coil using an AC voltage.
Figure 5:
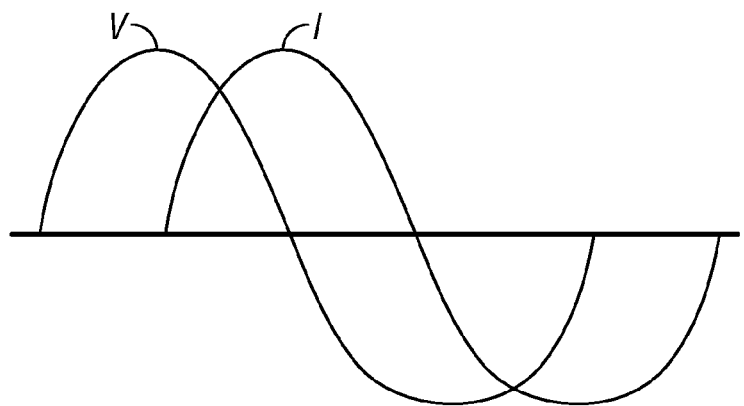
FIG. 5 is a graph that illustrates the operation of the embodiment of FIG. 4.

The drive circuit of the present invention may sense a position of the plunger via a first approach that involves determining the inductance of the solenoid by first determining its inductive reactance using phasor voltage and current measurements. This sensing approach does not cause the DC latching device to switch states. The physical properties of an actual DC latching solenoid can be modeled by a resistor in series with an inductor. The resistor typically represents the resistance of the wire used in the coil, but could also represent the resistance of the wiring leading up to the solenoid. This approach involves stimulating the solenoid with a small AC voltage, Vac, and measuring the current through it by monitoring the voltage across a small current sensing resistor Rs as illustrated in FIG. 4. The resistances in the circuit will contribute to a component of the current that is in-phase with the voltage source Vac. However, the inductance in the circuit will contribute a component to the current that is ninety degrees out of phase with this voltage. The reason this occurs is that for a pure inductor, current always lags voltage by ninety degrees as illustrated in FIG. 5. Accordingly, a drive circuit that utilizes the first approach initially measures the voltage across the solenoid, then measures the current ninety degrees lagging this voltage, and then calculates the inductive reactance XL using the ratio of these two. The inductance L is then $XL/(2\pi \times f)$ where f is the frequency of the AC signal. The inductance L will be significantly higher for the solenoid when the plunger is retracted versus when the plunger is not retracted. This first approach has an advantage of isolating the inductive load from the resistive load, therefore it is relatively impervious to long wire runs. Long wire runs also add inductance and capacitance, but only in very small amounts when compared to the inductance of the solenoid, and will therefore not affect the ability of the drive circuit to measure when the solenoid will latch.

Figure 6:
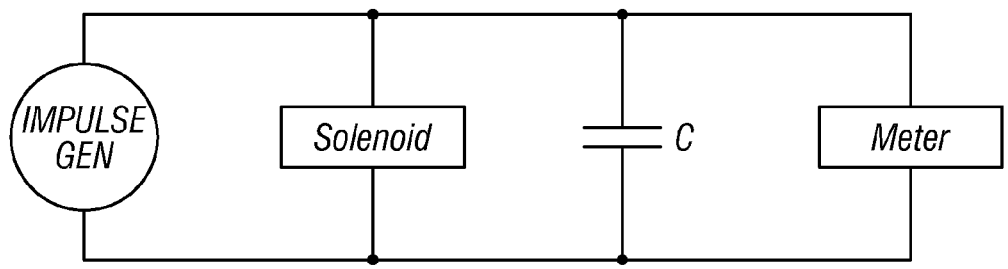
FIG. 6 is a functional block diagram of an alternate embodiment that senses a state of a DC latching solenoid by measuring an impulse response of its coil when forming a part of a resonant circuit.
Figure 7:
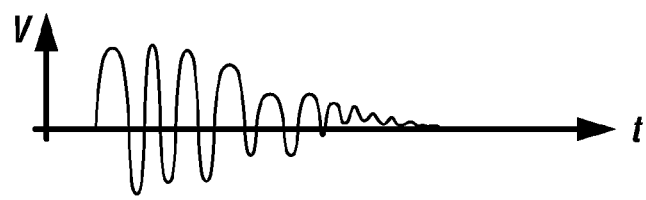
FIG. 7 is a graph that illustrates the operation of the embodiment of FIG. 6.

A second approach to sensing the position of the plunger involves determining the inductance of the coil by determining its impulse response. This approach does not cause the DC latching device to switch states. In accordance with the second approach a resonant circuit is set up that includes the solenoid inductance as illustrated in FIG. 6. The resonant circuit is then stimulated with a low-level step function or spectrally rich signal. This causes the resonant circuit to ring or resonate at its resonant frequency which is a function of the values of the inductance and the capacitance. The resonant signal eventually dies out as illustrated in FIG. 7. The resonant frequency can be determined using a meter, or microcontroller timer input, and the inductance is calculated by the following formula: $L=1/C(2\pi \times f)^2$. Limits may be set up for the calculated inductance to determine if the plunger is retracted (higher inductance) or not retracted (lower inductance). This approach can be used to merely check the state of the DC latching device, instead of changing its state. A low energy signal can be applied to the coil which has insufficient energy to change its state, and the signal from the coil can be processed to determine the state of the DC latching device.

Figure 8:
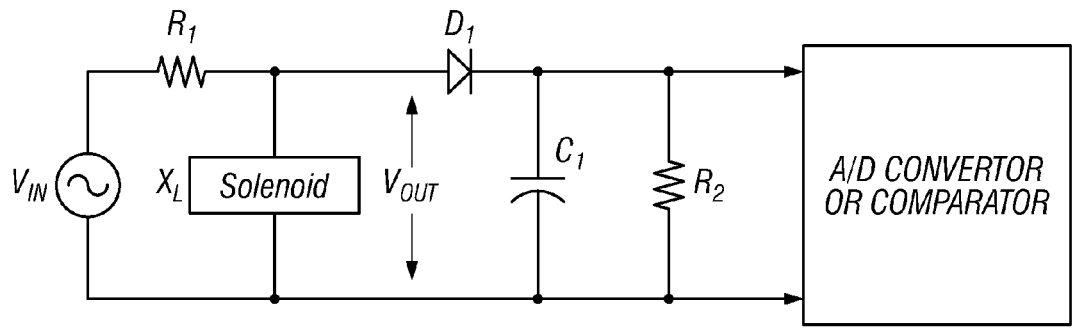
FIG. 8 is a functional block diagram of an alternate embodiment that senses a state of a DC latching solenoid by determining an inductive reactance of its coil.

A third approach to sensing the position of the plunger involves determining the inductance of the coil by first determining its inductive reactance using a voltage divider. This third approach does cause the DC latching device to switch between states. The third approach is similar to the first approach in that it uses the fact that the inductance, and therefore inductive reactance, increases as the plunger moves into the coil. FIG. 8 illustrates a drive circuit that executes the third approach. An AC input voltage, Vin, is divided between a resistor R1, and the inductive reactance ($XL=2\pi \times fL$) of the solenoid. Therefore for a given frequency f, XL will increase as L increases. The inductance L is considerably greater for a solenoid when the plunger is retracted, and therefore XL is also greater by the same proportion. The greater the XL, the more voltage will appear across the solenoid (Vout). Therefore, by measuring Vout and comparing it to a limit, the drive circuit can determine whether the plunger is retracted. If Vout is greater than the limit, the plunger is retracted. If Vout is less than the limit, the plunger is not retracted. The voltage Vout can be measured by rapid sampling using an A/D converter. However, this processing may take considerable bandwidth from the microcontroller. To lower the processing requirements, a simple peak detector (D1,C1,R2) can be employed as illustrated in FIG. 8. This peak detector converts the AC waveform into a DC signal which can be sampled much more slowly. When employing the third approach, Vin should be small enough so that the solenoid is not imparted with any sizeable amount of energy, that might risk the chance of actuation. The value of R1 should be chosen such that it is much greater than the internal resistance of the solenoid, or the expected resistance of the wire leading to the solenoid, since these may vary. Lastly, the frequency f should be chosen to result in an inductive reactance XL that is roughly the same order of magnitude as R1. This will result in the greatest output voltage change with changing L.

Figure 9:
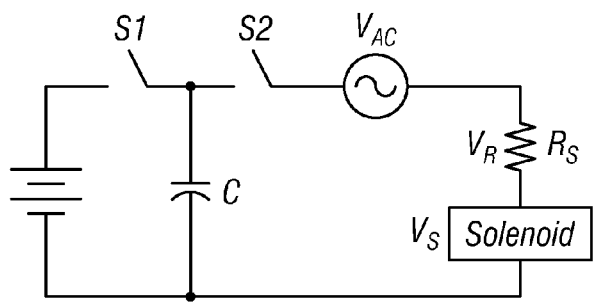
FIG. 9 is a functional block diagram of an alternate embodiment that senses a state of a DC latching solenoid while its state is being changed.
Figure 10:
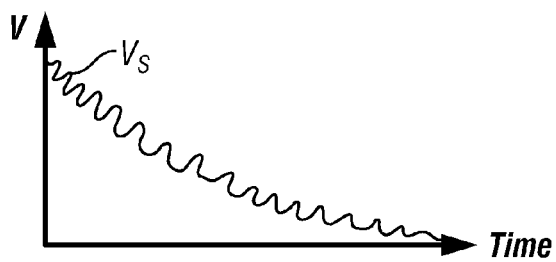
FIGS. 10 and 11 graphically illustrate the operation of the embodiment of FIG. 9.
Figure 11:
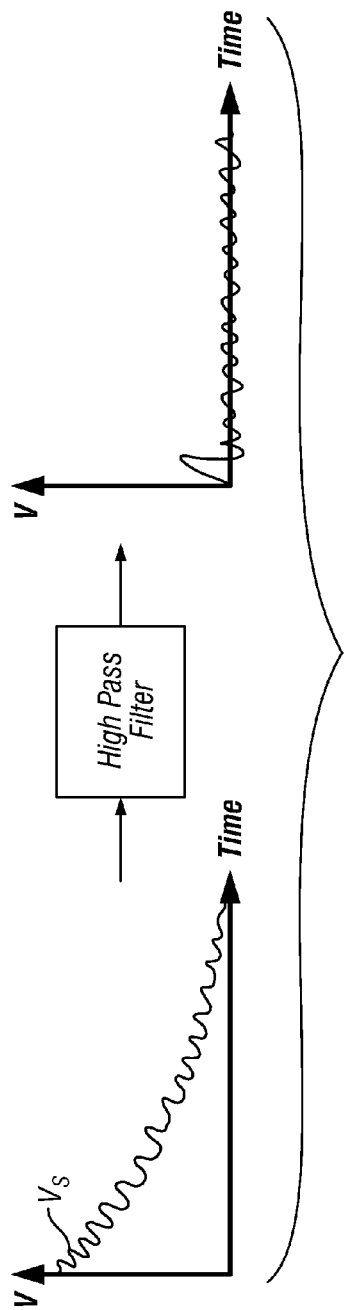

The three different approaches previously described can be used to determine the position of the plunger without disturbing the state of the solenoid. A fourth approach is similar to the first approach, but adds the ability to energize the solenoid, and determine the position of the plunger while it is being energized. A relatively small AC signal is used to stimulate the solenoid, and the AC voltage and current in the coil of the solenoid is measured at the same time. The AC signal is added to the energizing pulse. The AC signal is then filtered back out, and the first approach is utilized. An embodiment of a drive circuit that implements the fourth approach is illustrated in FIG. 9. Just as in the time domain approach, S1 is first closed to charge the storage element C, then S1 is opened and S2 is closed to discharge the storage element into the solenoid. In this embodiment an AC voltage, Vac, is added to the signal that is discharged into the storage element C. The resulting discharge curve is illustrated in FIG. 10. In FIG. 10, Vs is the voltage measured across the solenoid. The AC component rides on the primary DC discharging voltage. In order to apply the techniques of the first approach in the fourth approach it is necessary to isolate the AC signal from the discharge signal. This is done using a high pass or wide-band pass filter. This filter passes the high frequency AC voltage but not the slower changing discharge voltage as illustrated in FIG. 11. The use of an AC signal and a filter could be implemented with the third approach or any other approach which uses a small AC signal to determine XL and therefore L.

Figure 12:
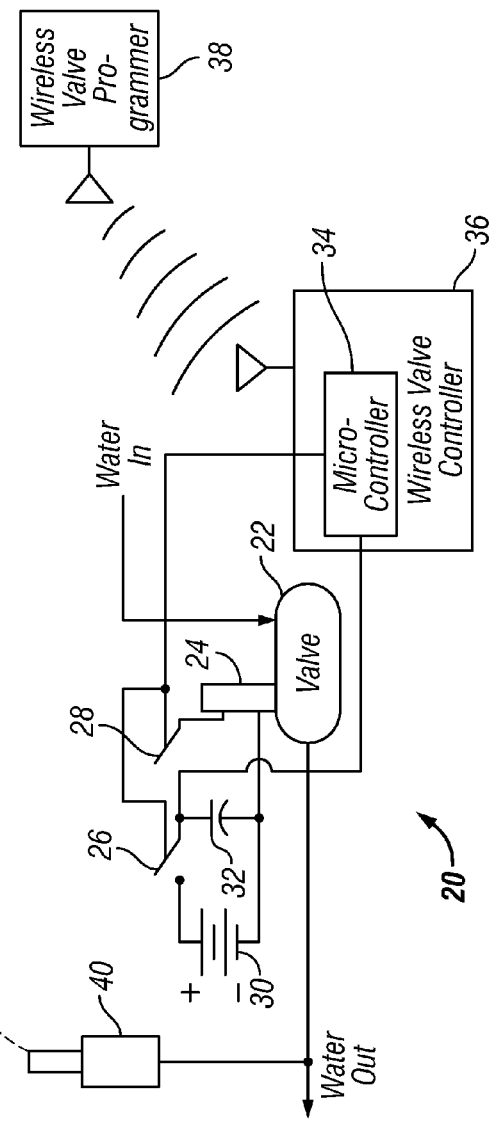
FIG. 12 is a functional block diagram of an irrigation system incorporating the present invention.

FIG. 12 is a functional block diagram of an irrigation system 20 incorporating the present invention. A valve 22 has a pilot orifice (not illustrated) that can be covered and uncovered to switch the valve between ON and OFF states. By way of example, the valve may be a diaphragm valve of the type disclosed in U.S. Pat. No. 5,979,482 granted Nov. 9, 1999 to Loren W. Scott, and assigned to Hunter Industries, Inc., the entire disclosure of which is hereby incorporated by reference, equipped with a DC latching solenoid 24 instead of the conventional solenoid illustrated in that patent. The DC latching solenoid 24 may be any suitable type, such as that disclosed in U.S. Pat. No. 4,494,096 of Fuzzell granted Jan. 15, 1985; U.S. Pat. No. 4,994,776 of Juncu granted Feb. 19, 1991; U.S. Pat. No. 6,351,199 of Perini granted Feb. 26, 2002; or U.S. Pat. No. 6,791,442 of Schmidt granted Sep. 14, 2004, the entire disclosures of which are hereby incorporated by reference. More particularly, the DC latching solenoid 24 may be the HUNTER DC latching solenoid part #458200, commercially available from Hunter Industries, Inc. of San Marcos, Calif.

Referring still to FIG. 12, the DC latching solenoid 24 has a coil and a plunger that reciprocates through the coil. The end of the plunger has a seal member that covers and uncovers the pilot orifice of the valve 22. A pair of solid state switches 26 and 28 connect a battery 30 to a storage element 32 for charging the storage element 32 from the battery 30 and discharging the storage element 32 into the coil of the solenoid 24. A micro-controller 34 determines the state of the DC latching solenoid 24 and terminates the discharge of the storage element 32 into the coil of the DC latching solenoid 24 in response to a determination that the solenoid 24 has changed states to thereby conserve energy in the battery 30 that would otherwise be dissipated. The micro-controller 34 of the irrigation system 20 may be part of a wireless valve controller 36, which may be the Wireless Valve Controller (WVC), commercially available from Hunter Industries, Inc. In the WVC the battery 30 is a standard nine volt battery. Watering programs and changes to existing watering programs may be downloaded into the wireless valve controller 36 via a wireless valve programmer 38, which may be the Wireless Valve Programmer (WVP), commercially available from Hunter Industries, Inc. The valve 22 is turned ON and OFF to control watering by a sprinkler 40 that ejects a stream of water 42 onto surrounding turf and/or landscaping.

Figure 13:
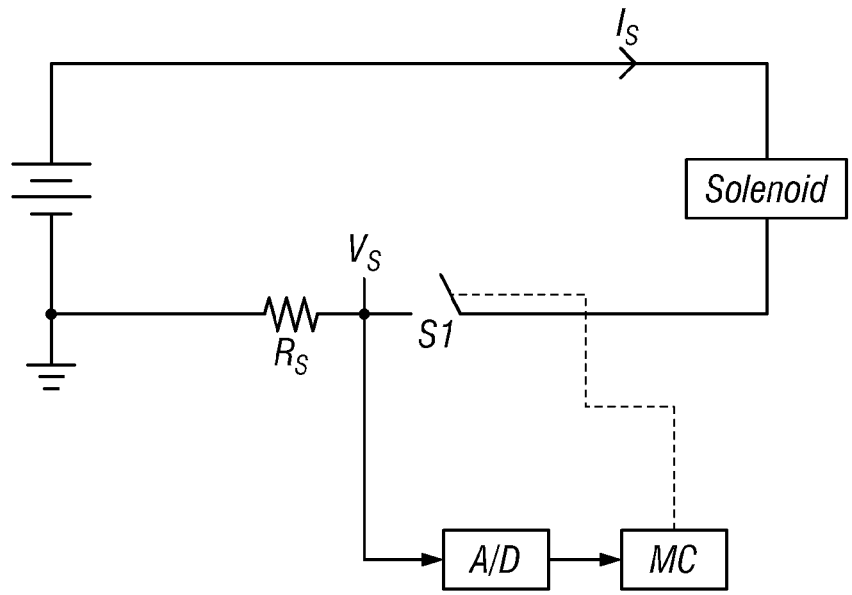
FIG. 13 is a functional block diagram of a circuit similar to FIG. 1, except there is only a battery supplying power to the DC latching device, the storage element is not required in this design.
Figure 14:
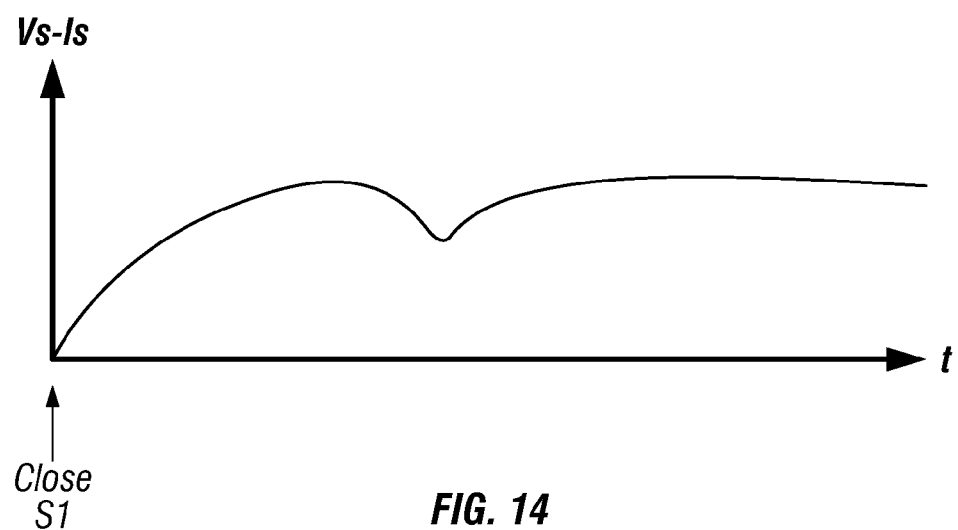
FIG. 14 is a graph illustrating the operation of the drive circuit of FIG. 13.
Figure 15:
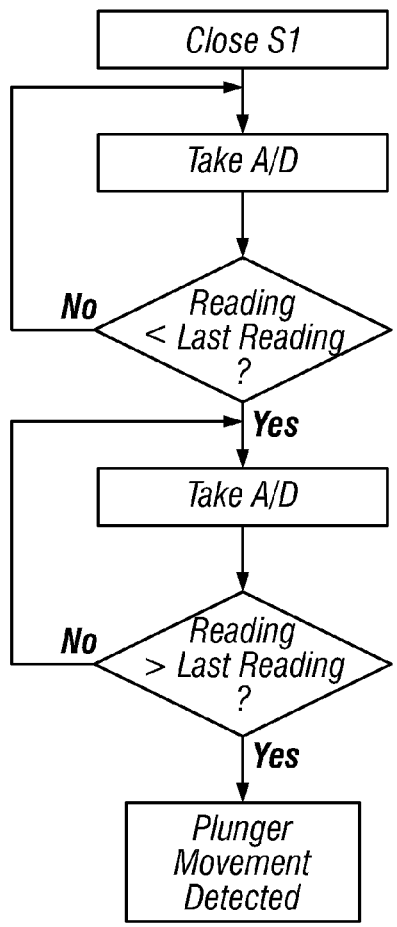
FIG. 15 is a flow diagram illustrating the operation of the drive circuit of FIG. 13.
Figure 16:
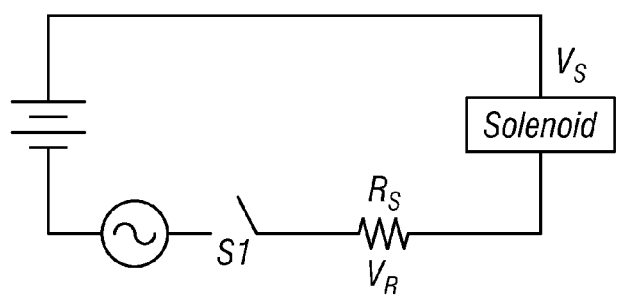
FIG. 16 is a is a functional block diagram of an alternate embodiment that senses a state of a DC latching solenoid while its state is being changed. This is embodiment similar to the FIG. 9 embodiment except there is only a battery supplying power to the DC latching device, and the storage element is not required in this design.
Figure 17:
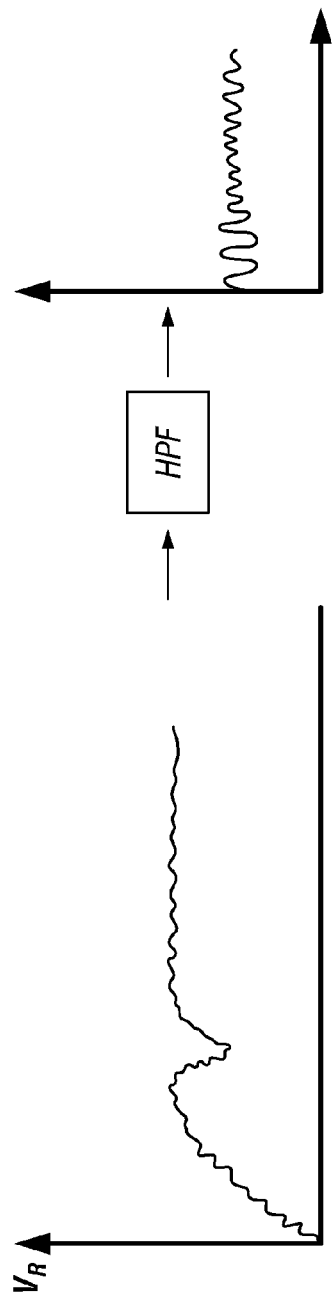
FIG. 17 is a graph that illustrates the operation of the embodiment of FIG. 16.
Figure 18:
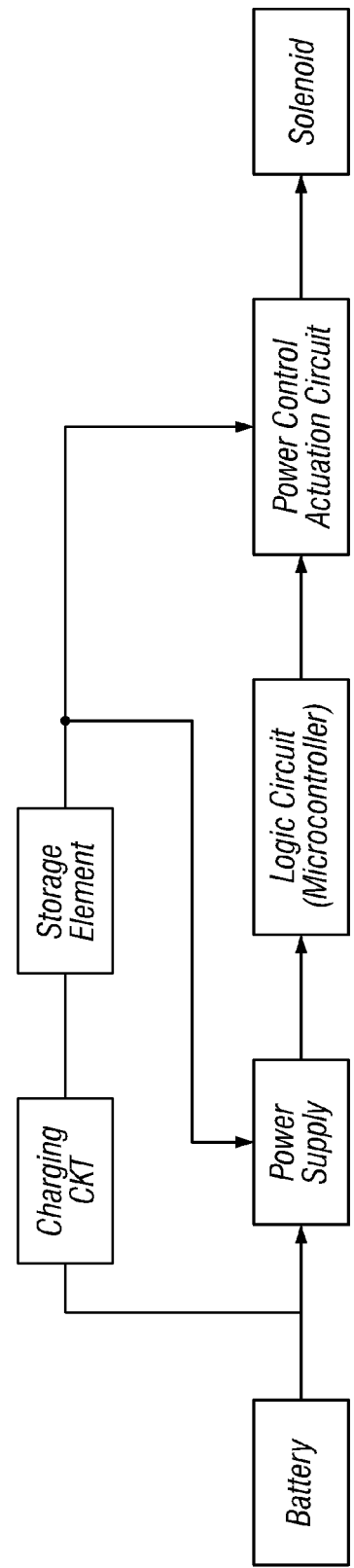
FIG. 18 is a flow diagram that shows the energy diverting circuit that routes the excess energy from the storage element back to the control circuit after the solenoid has changed state.

FIG. 13 is a functional block diagram of a circuit similar to FIG. 1, except there is only a battery supplying power to the DC latching device, and the storage element is not required in this design. FIG. 14 is a graph illustrating the operation of the drive circuit of FIG. 13. FIG. 15 is a flow diagram illustrating the operation of the drive circuit of FIG. 13. FIG. 16 is a functional block diagram of an alternate embodiment that senses a state of a DC latching solenoid while its state is being changed. This embodiment is similar to the FIG. 9 embodiment except there is only a battery supplying power to the DC latching device, and the storage element is not required in this design. FIG. 17 is a graph that illustrates the operation of the embodiment of FIG. 16. FIG. 18 is a flow diagram that shows the energy diverting circuit that routes the excess energy from the storage element back to the control circuit after the solenoid has changed state.

While we have described several embodiments of a drive circuit for use with DC latching devices it will be understood by those skilled in the art that our invention may be further modified in arrangement and detail. The functions in the drive circuit can be performed by "circuitry" in the form of various different types of discrete electronic components and/or firmware executed by a micro-controller or microprocessor. Improved batteries can make it unnecessary to include separate storage element. Therefore, the protection afforded our invention should only be limited in accordance with the scope of the following claims.

We claim:

1. A drive circuit for a DC latching device, comprising:
   a battery;
   a storage element;
   a plurality of switches including a first switch connected between the battery to the storage element for charging the storage element from the battery and a second switch connected between the storage element and a coil of a DC latching device for discharging the storage element into the coil of the DC latching device;
   circuitry that determines when the DC latching device has changed states; and
   circuitry that terminates the discharge of the storage element into the coil of the DC latching device in response to determining that the DC latching device has changed states.

2. The drive circuit of claim 1 wherein the circuitry that determines the state of the DC latching device includes circuitry that applies an AC signal to the coil and circuitry that measures an inductance of the coil.

3. The drive circuit of claim 1 wherein the circuitry that determines the state of the DC latching device includes circuitry that applies a signal which is spectrally rich to a resonant circuit including the coil and the storage element, and circuitry that determines an inductance of the coil based on a detected resonant frequency.

4. The drive circuit of claim 1 wherein the circuitry that determines the state of the DC latching device includes circuitry that determines an inductive reactance of the coil using a voltage divider.

5. The drive circuit of claim 1 wherein the circuitry that determines the state of the DC latching device includes circuitry that adds an AC signal to a signal discharged from the storage element into the coil, a filter that removes an AC component of a resulting signal from the coil to produce a filtered signal, and circuitry that determines the state of the DC latching device by determining an inductance from the filtered signal.

6. The drive circuit of claim 1 wherein the DC latching device is a DC latching solenoid mounted in a pilot valve assembly of an irrigation valve.

7. An irrigation system, comprising:
a valve having a pilot orifice that can be covered and uncovered to switch the valve between ON and OFF states;
a DC latching solenoid having a coil and a plunger that reciprocates through the coil to cover and uncover the pilot orifice;
a battery;
a storage element;
a plurality of switches including a first switch connected between the battery to the storage element for charging the storage element from the battery and a second switch connected between the storage element and a coil of a DC latching device for discharging the storage element into the coil of the DC latching device;
means for determining a state of the solenoid; and
means for terminating the discharge of the storage element into the coil of the solenoid in response to a determination that the solenoid has changed states.

8. The irrigation system of claim 7 wherein the means for determining the state of the solenoid includes circuitry that applies an AC signal to the coil and circuitry that measures an inductance of the coil.

9. The irrigation system of claim 7 wherein the means for determining the state of the solenoid includes circuitry that applies a spectrally rich signal to a resonant circuit including the coil and the storage element, and circuitry that determines an inductance of the coil based on a detected resonant frequency.

10. The irrigation system of claim 7 wherein the means for determining the state of the solenoid includes circuitry that determines an inductive reactance of the coil using a voltage divider.

11. The irrigation system of claim 7 wherein the means for determining the state of the solenoid includes circuitry that adds an AC signal to a signal discharged from the storage element into the coil, a filter that removes an AC component of a resulting signal from the coil to produce a filtered signal, and circuitry that determines the state of the solenoid by determining an inductance of the filtered signal.

12. A drive circuit for a DC latching device, comprising:
a battery;
a storage element;
a plurality of switches including a first switch connected between the battery to the storage element for charging the storage element from the battery and a second switch connected between the storage element and a coil of a DC latching device for discharging the storage element into the coil of the DC latching device;
circuitry that determines when the DC latching device has changed states by measuring an inductance of the coil; and
circuitry that terminates the discharge of the storage element into the coil of the DC latching device in response to determining that the DC latching device has changed states.

13. The drive circuit of claim 12 wherein the inductance of the coil is measured by measuring a current through the coil.

14. The drive circuit of claim 12 wherein inductance of the coil is measured by measuring a current through the coil that lags a voltage across the coil by ninety degrees.

15. The drive circuit of claim 12 wherein the inductance of the coil is measured by determining an impulse response of the coil.

16. The drive circuit of claim 12 wherein the circuitry that measures the inductance of the coil includes a resonant circuit.

17. The drive circuit of claim 16 wherein the circuitry that measures the inductance of the coil detects when the resonant circuit resonates.

18. The drive circuit of claim 17 wherein the circuitry that measures the inductance of the coil determines a resonant frequency of the resonant circuit.

19. The drive circuit of claim 12 wherein the circuitry that measures the inductance of the coil determines an inductive reactance of the coil.

20. A drive circuit for a DC latching device, comprising:
a battery;
a storage element;
a plurality of switches including a first switch connected between the battery to the storage element for charging the storage element from the battery and a second switch connected between the storage element and a coil of a DC latching device for discharging the storage element into the coil of the DC latching device;
circuitry that determines when the DC latching device has changed states; and
circuitry that terminates the discharge of the storage element into the coil of the DC latching device in response to determining that the DC latching device has changed states by detecting an inflection point in a discharge signal from the storage element.

* * * * *